(12) United States Patent
Hinrichs et al.

(10) Patent No.: US 7,959,206 B2
(45) Date of Patent: Jun. 14, 2011

(54) RETRACTABLE ROOF SYSTEM FOR A VEHICLE

(75) Inventors: Frank Hinrichs, Hiroshima (JP); Minoru Okamura, Hiroshima (JP)

(73) Assignee: Webasto AG (DE)

( * ) Notice: Subject to any disclaimer, the term of this patent is extended or adjusted under 35 U.S.C. 154(b) by 5 days.

(21) Appl. No.: 12/295,081

(22) PCT Filed: Mar. 28, 2007

(86) PCT No.: PCT/JP2007/056635
§ 371 (c)(1),
(2), (4) Date: Dec. 9, 2008

(87) PCT Pub. No.: WO2007/114161
PCT Pub. Date: Oct. 11, 2007

(65) Prior Publication Data
US 2009/0102228 A1    Apr. 23, 2009

(30) Foreign Application Priority Data

Mar. 28, 2006 (JP) ................................. 2006-088230

(51) Int. Cl.
*B60J 7/20* (2006.01)
(52) U.S. Cl. .................................................. 296/107.08
(58) Field of Classification Search ............. 296/107.08, 296/136.05, 136.06, 124, 128, 134
See application file for complete search history.

(56) References Cited

U.S. PATENT DOCUMENTS

| | | |
|---|---|---|
| 5,904,395 A | 5/1999 | Wedin |
| 5,975,619 A | 11/1999 | Dettling et al. |
| 6,604,775 B2 | 8/2003 | Obendiek |
| 7,392,873 B2 * | 7/2008 | Habacker .................... 180/69.2 |
| 2001/0028177 A1 | 10/2001 | Okada et al. |

FOREIGN PATENT DOCUMENTS

| | | |
|---|---|---|
| DE | 100 39 682 A1 | 3/2002 |
| DE | 101 16 710 A1 | 10/2002 |
| DE | 103 13 496 A1 | 10/2004 |
| EP | 1 318 041 A1 | 6/2003 |
| EP | 1595729 A2 | 11/2005 |
| JP | 5-32057 A | 4/1993 |
| JP | 9-328948 | 12/1997 |
| JP | 10-119580 | 5/1998 |
| JP | 2001-241242 A | 9/2001 |
| JP | 2002-264658 A | 9/2002 |
| WO | 2004/035337 A1 | 4/2004 |
| WO | 2004/043723 A2 | 5/2004 |

OTHER PUBLICATIONS

International Search Report; PCT/JP2007/056635; Date Jul. 3, 2007.
The Extended European Search Report dated Mar. 11, 2011; Application No. 07740073.7-2423 / Patent No. 2006142; PCT/JP2007056635.

* cited by examiner

*Primary Examiner* — Joseph D Pape
(74) *Attorney, Agent, or Firm* — Studebaker & Brackett PC; Donald R. Studebaker

(57) ABSTRACT

A retractable roof system for a vehicle is provided with a roof locking apparatus (70) provided in a vehicle body and retaining a retractable roof in a storage space (7) which is different from a trunk space, and a link mechanism (10) provided in the vehicle body and capable of changing a position of a lid (6) covering the storage space (7) so as to open and close to an open position and a closed position. The roof locking apparatus (70) is structured such as to work with the link mechanism (10).

8 Claims, 10 Drawing Sheets

RETRACTABLE ROOF SYSTEM FOR A VEHICLE

TECHNICAL FIELD

The present invention relates to a retractable roof system for a vehicle.

BACKGROUND ART

Conventionally, there has been known a retractable roof system for a vehicle structured such that a lid covering a storage space so as to open and close covers the storage space at a time of storing a retractable roof which can be stored in the storage space (refer to patent document 1). The retractable roof system for a vehicle is provided with a roof locking apparatus retaining a roof in a full-close state. Accordingly, it is possible to inhibit the roof in the full-close state from wobbling.

Patent Document 1: Japanese Unexamined Patent Publication No. 2001-241242

DISCLOSURE OF THE INVENTION

Problems that the Invention is to Solve

In this case, the roof locking apparatus mentioned above is provided uniquely with an electric motor exclusive for this, and is driven thereby, and the number of the members is increased. Accordingly, there has been conventionally desired to reduce the number of the members in the retractable roof system for a vehicle.

The present invention is made by taking the points mentioned above into consideration, and an object of the present invention is to provide a retractable roof system for a vehicle which can reduce the number of the members.

Means for Solving the Problem

In accordance with a first invention, there is provided a retractable roof system for a vehicle structured such that a lid covering a storage space so as to open and close covers the storage space at a time of storing a retractable roof capable of being stored in the storage space which is different from a trunk space, including:

a roof locking apparatus provided in a vehicle body and retaining the roof in a predetermined space; and a lid driver provided in the vehicle body and capable of changing a position of the lid to an open position and a closed position, wherein the roof locking apparatus is structured such as to work with the lid driver.

Accordingly, since the roof locking apparatus is worked with the lid driver, it is not necessary to provide a driving source which is exclusive for the roof locking apparatus, and it is possible to reduce the number of the members of the present system.

In accordance with a second invention, in the first invention, the roof locking apparatus is structured such as to retain the roof in the storage space corresponding to the predetermined space.

Accordingly, it is not necessary to provide the driving source which is exclusive for the roof locking apparatus retaining the roof in the storage space.

In accordance with a third invention, in the second invention, the roof has a front roof, a rear roof, and a rear window, and the roof locking apparatus is structured such as to retain the front roof in the storage space.

Accordingly, it is not necessary to provide the driving source which is exclusive for the roof locking apparatus retaining the front roof in the storage space.

In accordance with a fourth invention, in the second or third invention, the roof locking apparatus is structured such as to start a retaining motion of the roof in the storage space approximately at the same time when the lid driver starts a position changing motion of the lid to the closed position, and finish the retaining motion of the roof approximately at the same time when the lid driver finishes the position changing motion of the lid to the closed position, in the case of storing the roof in the storage space.

Accordingly, since the roof locking apparatus is structured such as to start the retaining motion of the roof in the storage space approximately at the same time when the lid driver starts the position changing motion of the lid to the closed position, and finish the retaining motion of the roof in the storage space approximately at the same time when the lid driver finishes the position changing motion of the lid to the closed position, in the case of storing the roof in the storage space, it is possible to retain the roof in the storage space at a suitable timing.

In accordance with a fifth invention, in any one of the second to fourth inventions, the roof locking apparatus is structured such as to start a canceling motion of the retention of the roof in the storage space approximately at the same time when the lid driver starts the position changing motion of the lid to the open position, and finishes the canceling motion of the retention of the roof approximately at the same time when the lid driver finishes the position changing motion of the lid to the open position, in the case of getting the roof stored in the storage space out of the storage space.

Accordingly, since the roof locking apparatus is structured such as to start the canceling motion of the retention of the roof in the storage space approximately at the same time when the lid driver starts the position changing motion of the lid to the open position, and finish the canceling motion of the retention of the roof in the storage space approximately at the same time when the lid driver finishes the position changing motion of the lid to the open position, in the case of getting the roof stored in the storage space out of the storage space, it is possible to cancel the retention of the roof in the storage space at a suitable timing.

In accordance with a sixth invention, in any one of the second to fifth inventions, the roof locking apparatus includes:

a roof locking mechanism retaining the roof in the storage space; and a transmission mechanism transmitting a driving force of the lid driver to the roof locking mechanism so as to carry out the retaining motion of the roof and the canceling motion thereof.

Accordingly, since the retaining motion of the roof in the storage space and the canceling motion thereof are carried out by transmitting the driving force of the lid driver to the roof locking mechanism by means of the transmission mechanism, it is possible to securely retain the roof and cancel the retention in the storage space.

In accordance with a seventh invention, in the sixth invention, the transmission mechanism has a push-pull cable in which one end portion is attached to the roof locking mechanism, and the other end portion is attached to the lid driver, and the push-pull cable is structured such as to be pulled so as to make the roof locking mechanism carry out the retaining motion of the roof in the case that the lid driver carries out the position changing motion of the lid to the closed position, at a time of storing the roof in the storage space, and be discharged so as to make the roof locking mechanism carry out the canceling motion of the retention of the roof in the case that the lid driver carried out the position changing motion of the lid to the open position, at a time of getting the roof stored in the storage space out of the storage space.

Accordingly, it is possible to retain the roof in the storage space and cancel the retention on the basis of the simple structure.

In accordance with an eighth invention, in the seventh invention, the lid driver has a link which is fixed to the lid and is provided for changing the lid to the open position and the closed position, and a wire guiding fixed to the link and to which the other end portion of the push-pull cable is attached, the wire guiding carries out a pulling motion of the push-pull cable in the case that the link carries out the position changing motion of the lid to the closed position at a time of storing the roof in the storage space, and the wire guiding carries out a discharging motion of the push-pull cable in the case that the link carried out the position changing motion of the lid to the open position at a time of getting the roof stored in the storage space out of the storage space.

Accordingly, it is possible to retain the roof in the storage space and cancel the retention, on the basis of the simple structure.

In accordance with a ninth invention, in the eighth invention, a groove around which the push-pull cable is wound is formed in the wire guiding.

Accordingly, the wire guiding can securely carry out the pulling motion and the discharging motion of the push-pull cable.

In accordance with a tenth invention, in the ninth invention, the lid driver further has a holder provided so as to cover the groove.

Accordingly, since the holder is provided so as to cover the groove of the wire guiding, it is possible to inhibit the push-pull cable from coming off from the groove.

Effect of the Invention

In accordance with the present invention, since the roof locking apparatus is worked with the lid driver, it is not necessary to provide the driving source which is exclusive for the roof locking apparatus, and it is possible to reduce the number of the members of the present system.

DESCRIPTION OF REFERENCE NUMERALS 1 road vehicle
2 front roof
3 back roof
4 rear window
5 retractable roof
6 lid
7 storage space
10 link mechanism (lid driver)
14 driving lever (link)
61 wire guiding
61a groove
62 holder
70 roof locking apparatus
71 hook (roof locking mechanism)
72 internal slider (roof locking mechanism)
73 slider (roof locking mechanism)
74 rail (roof locking mechanism)
90 push-pull cable (transmission mechanism)

BEST MODE FOR CARRYING OUT THE INVENTION

A description will be in detail given below of an embodiment in accordance with the present invention with reference to the accompanying drawings.

Figure 1:
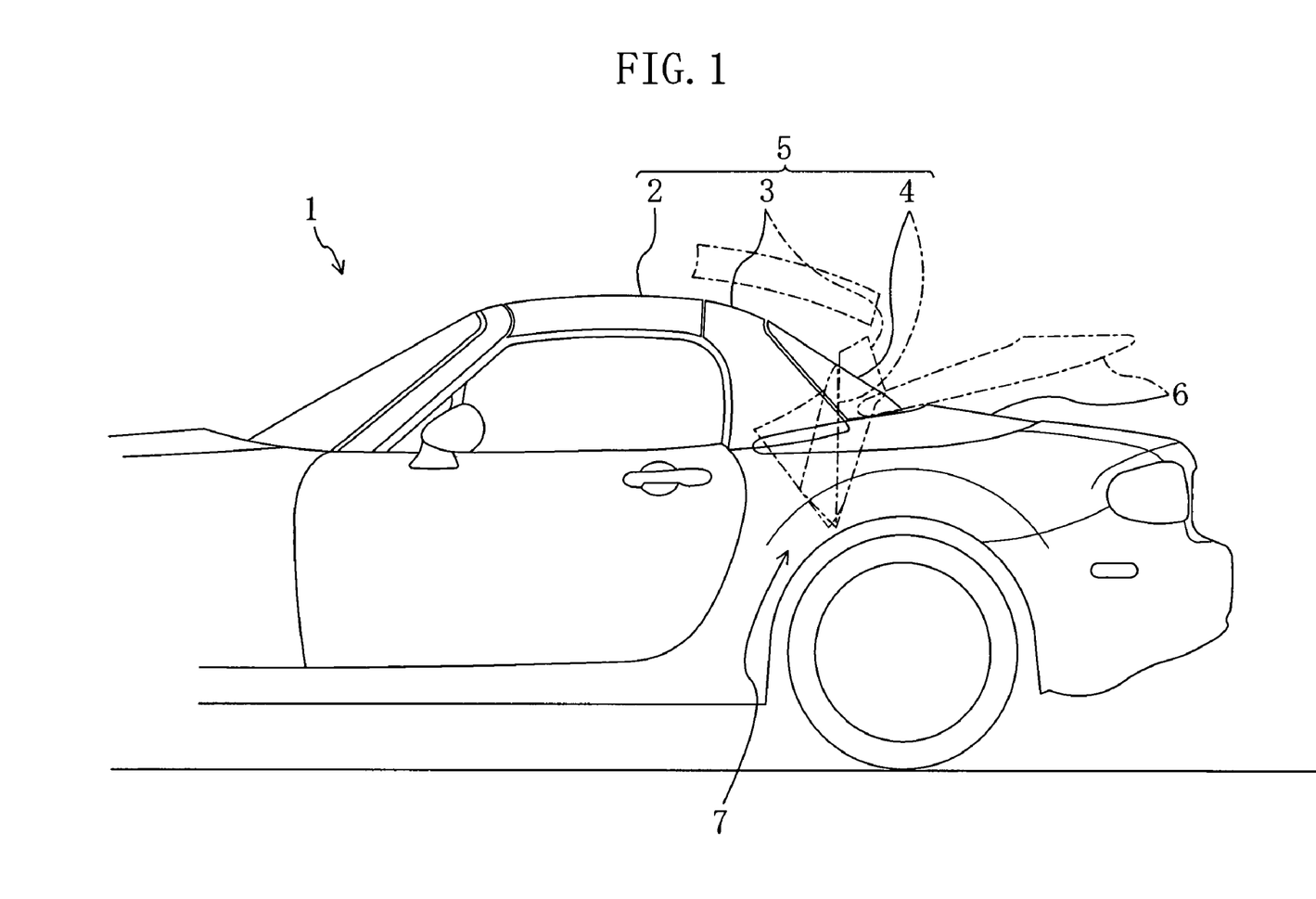
FIG. 1 is a schematic side elevational view showing a road vehicleprovided with a retractable roof in accordance with an embodiment of the present invention.
Figure 2:
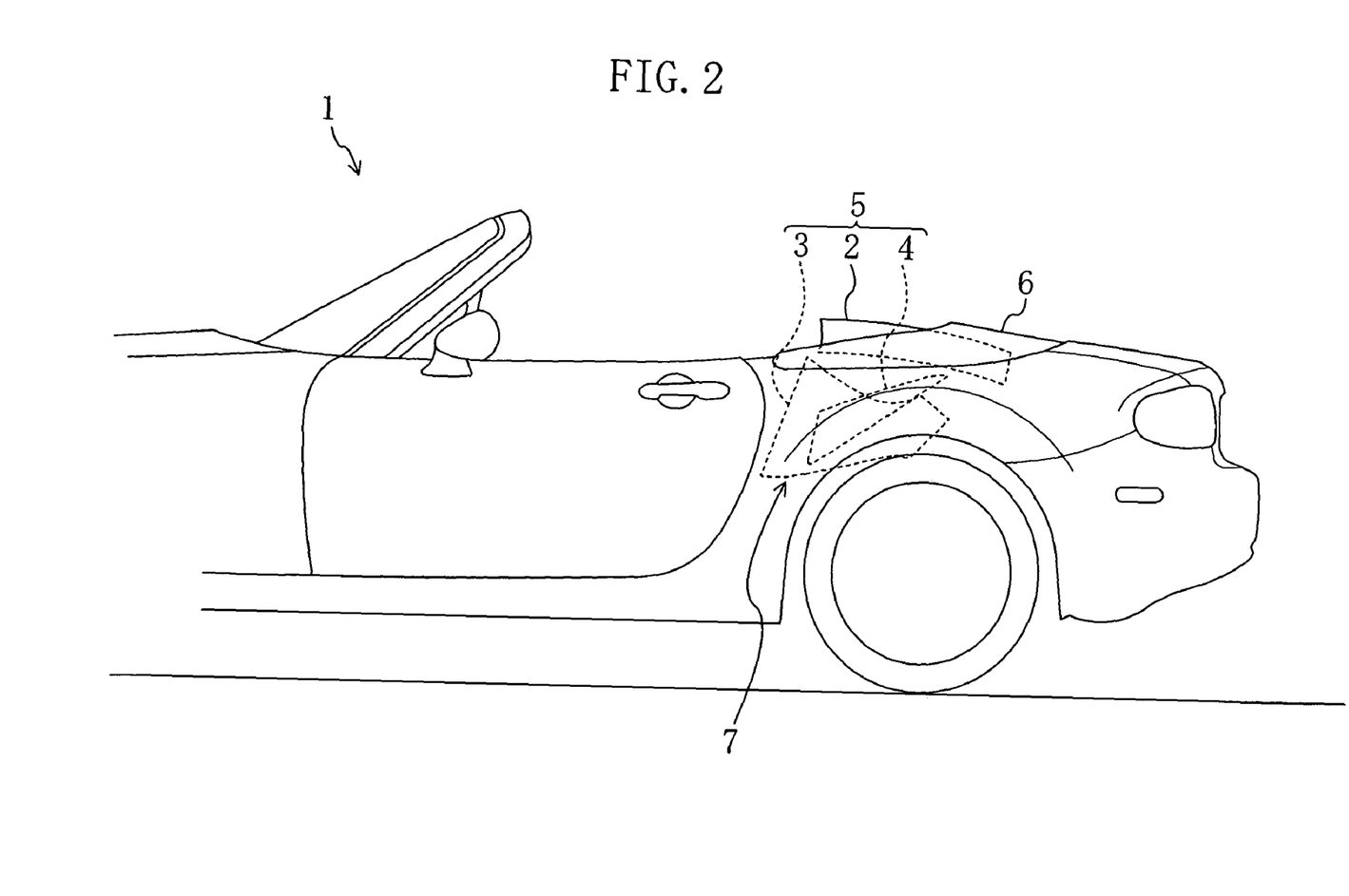
FIG. 2 is a schematic side elevational view showing the road vehicleprovided with the retractable roof.
Figure 3:
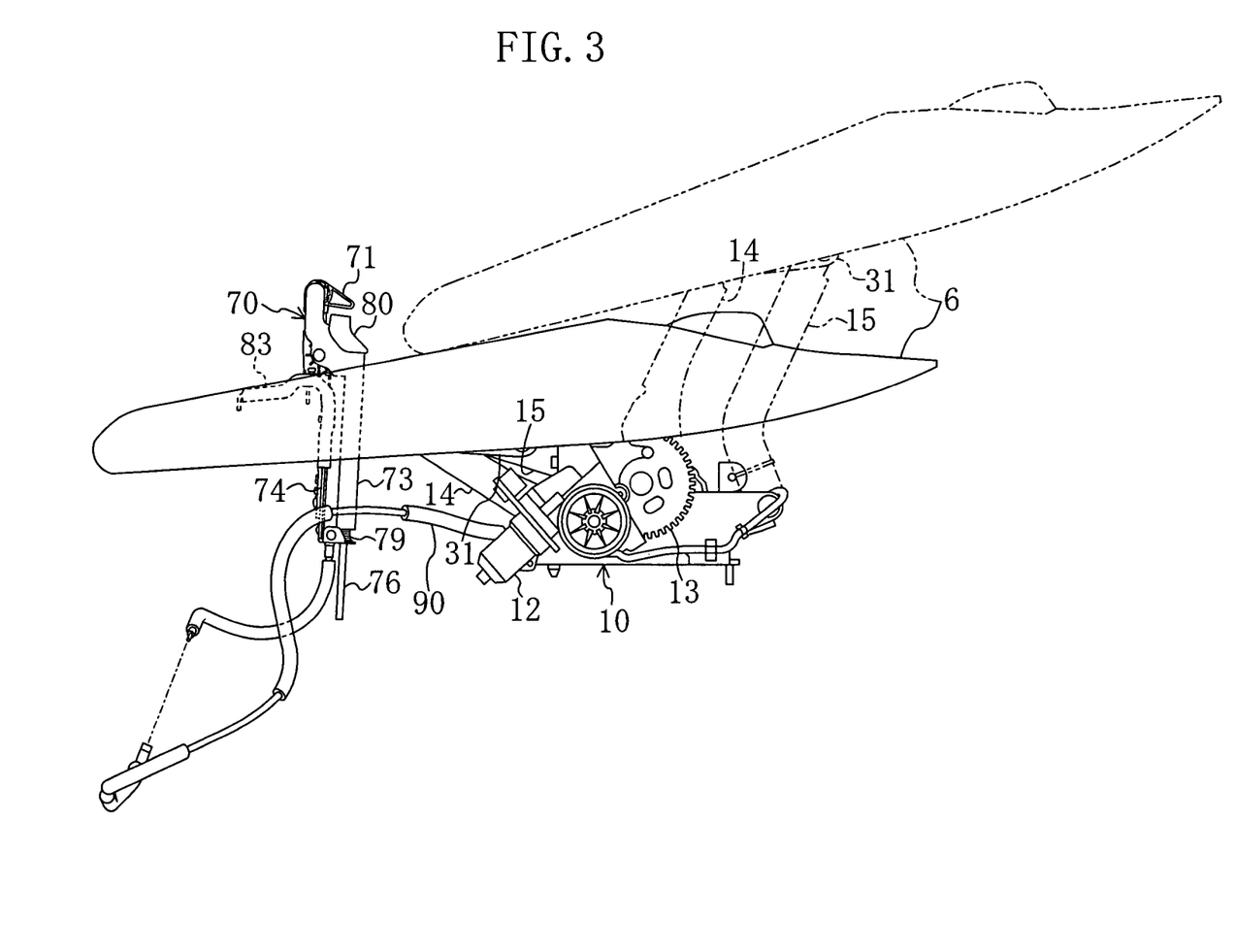
FIG. 3 is a side elevational view of a link mechanism and a roof locking apparatus.
Figure 4:
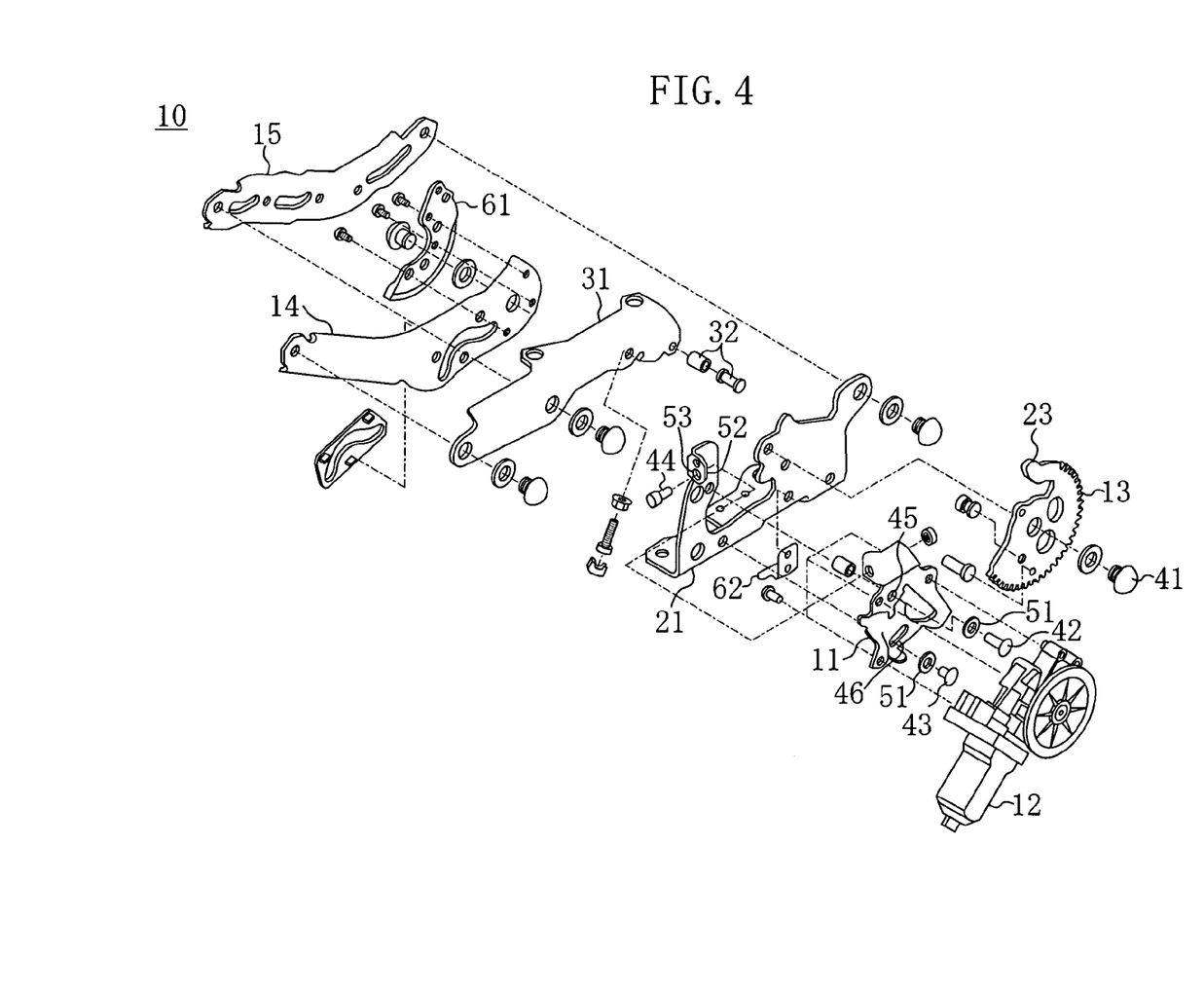
FIG. 4 is an exploded perspective view of the link mechanism.
Figure 5:
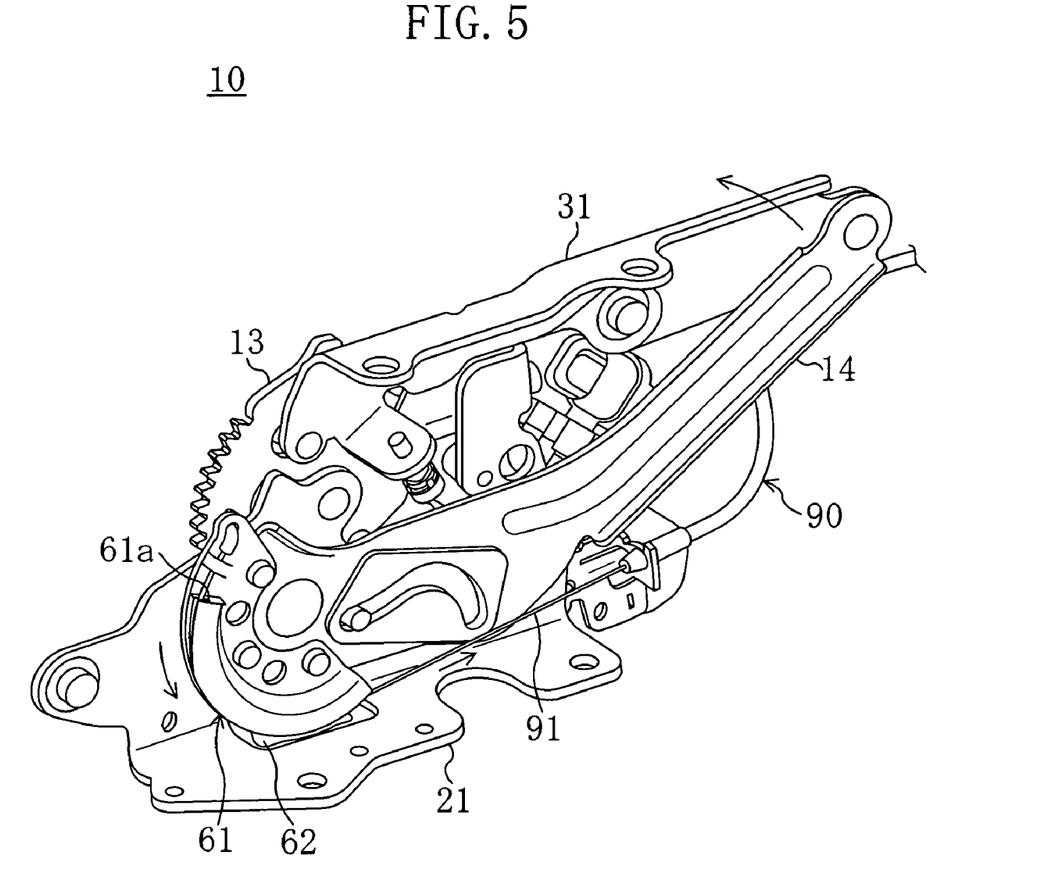
FIG. 5 is a perspective view of the link mechanism at a time when a lid is in a closed state.
Figure 6:
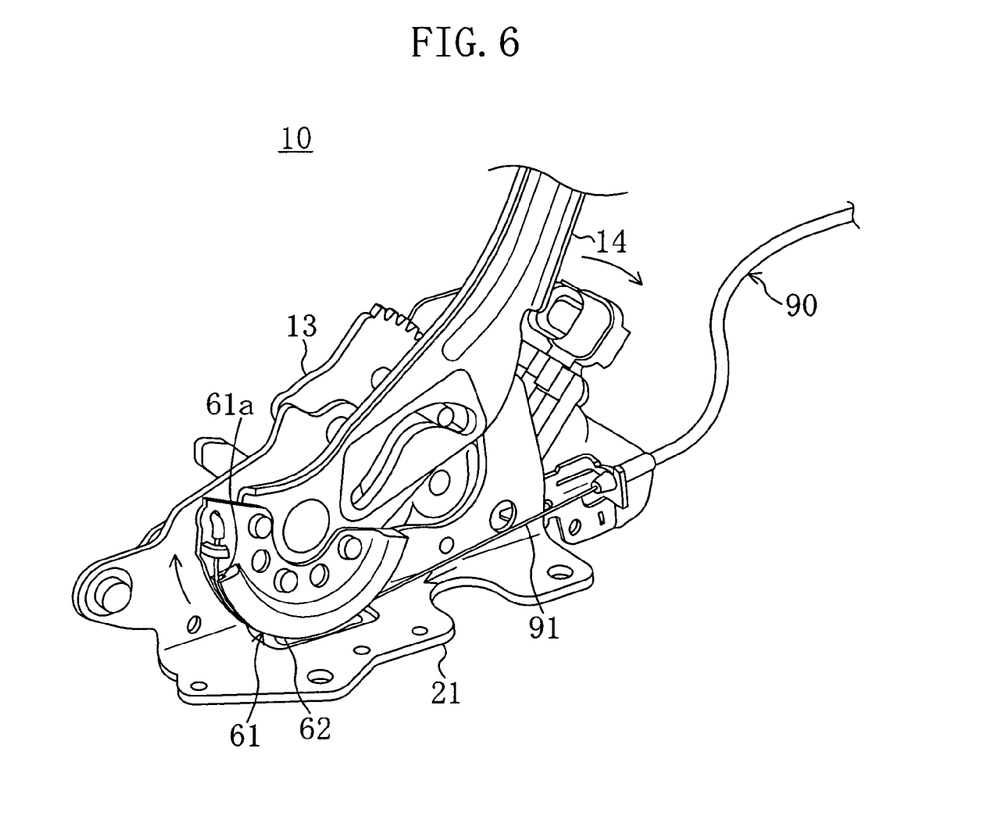
FIG. 6 is a perspective view of the link mechanism at a time when the lid is in an open state.
Figure 7:
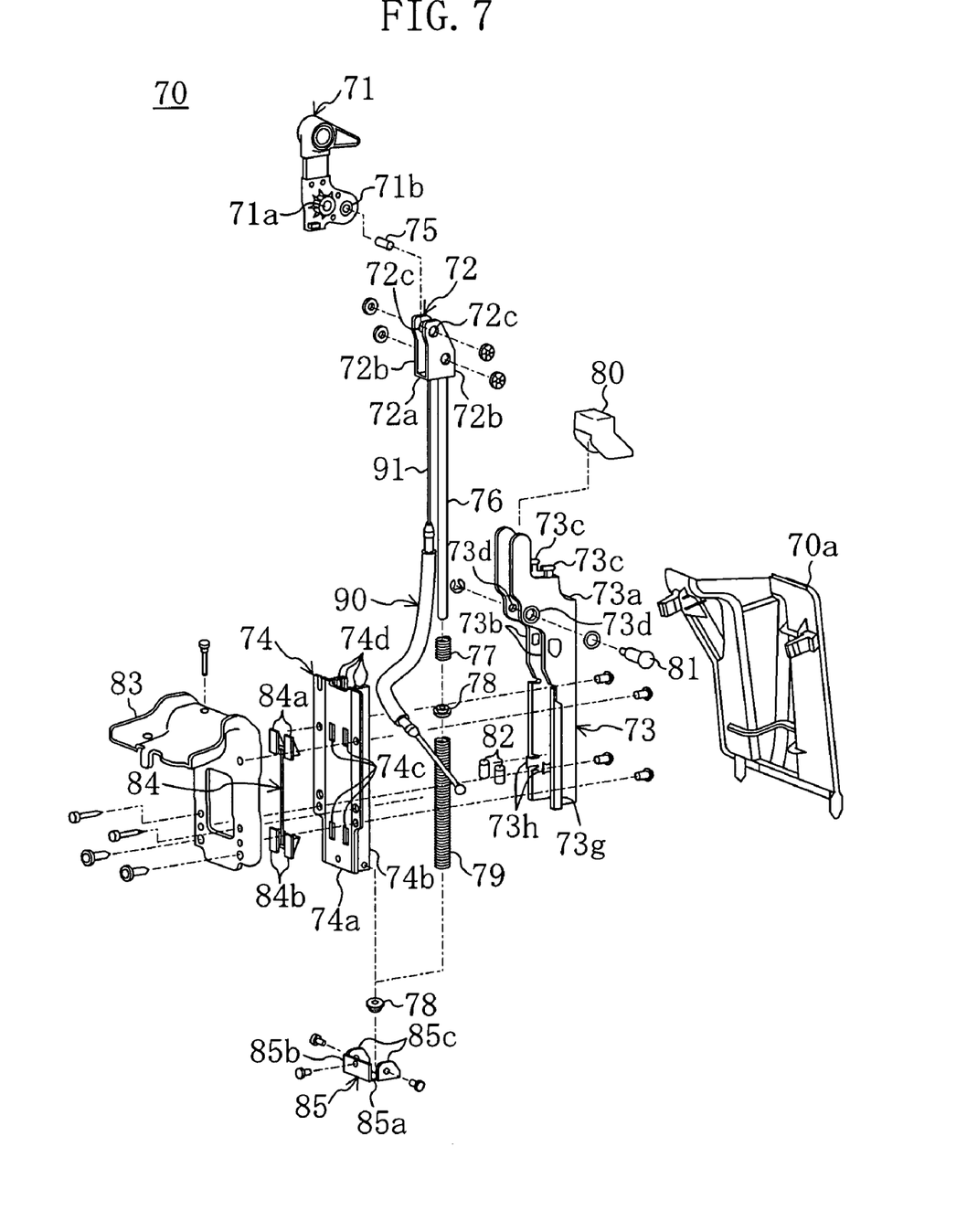
FIG. 7 is an exploded perspective view of a roof locking mechanism.
Figure 8:
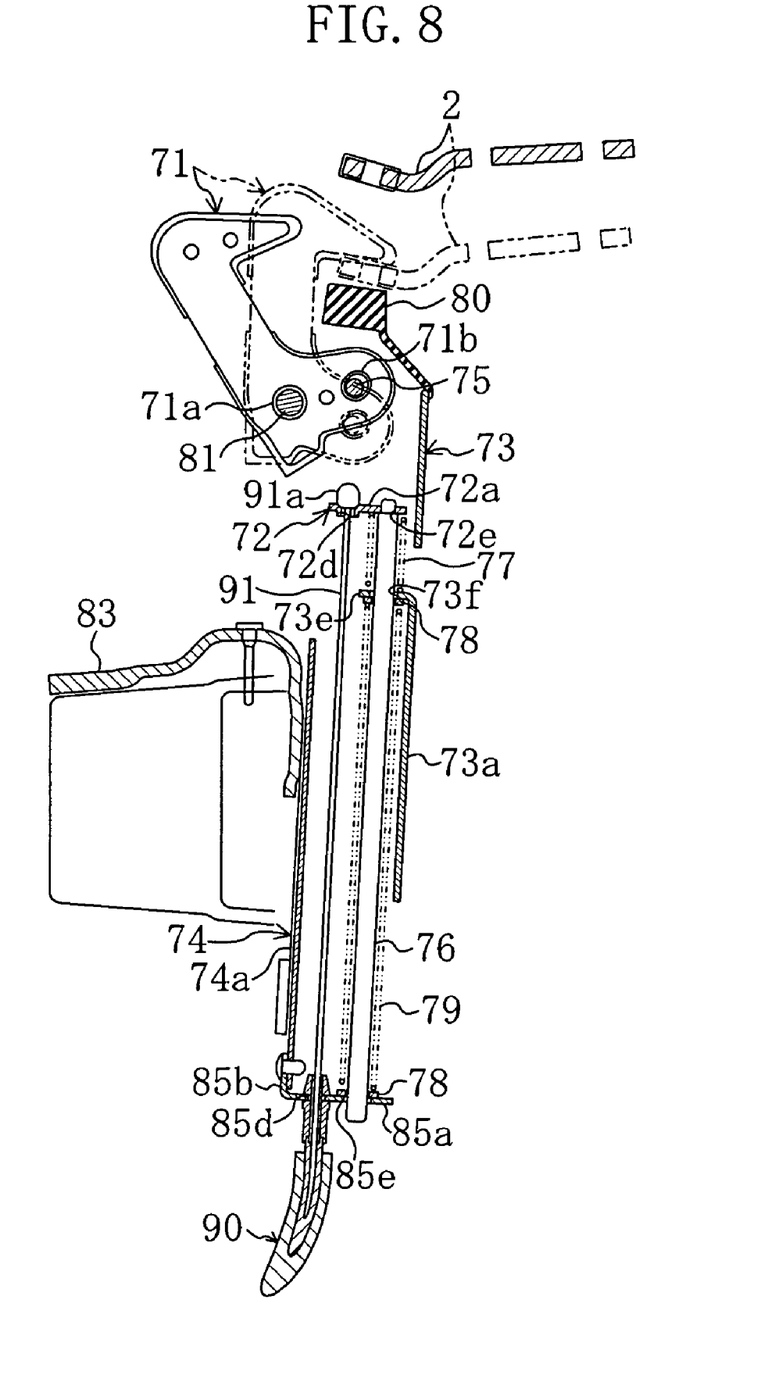
FIG. 8 is a sectional view of the roof locking mechanism at a time when a hook is in a grip-disengaging mode.
Figure 9:
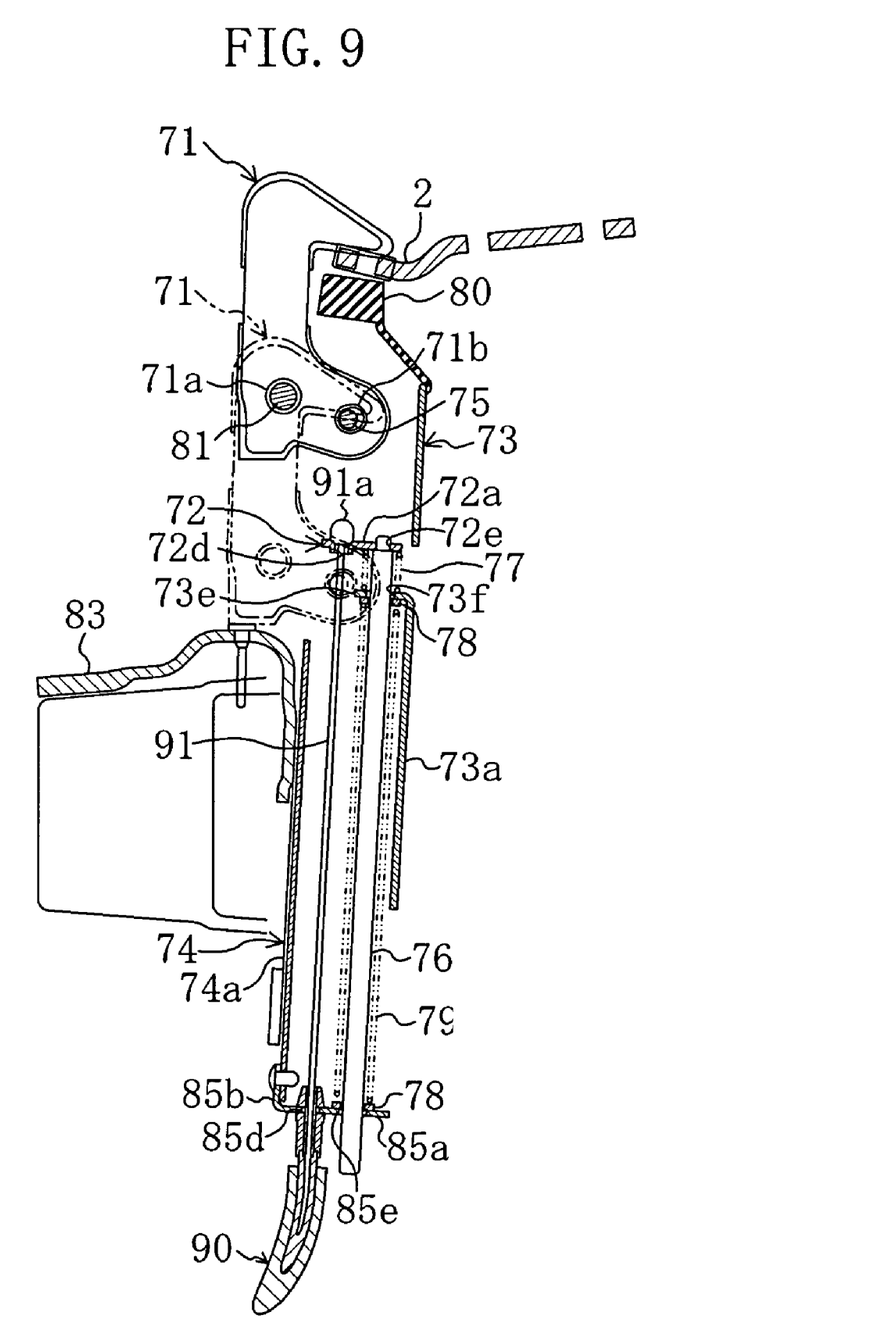
FIG. 9 is a sectional view of the roof locking mechanism at a time when a grip member exists at a gripping position.
Figure 10:
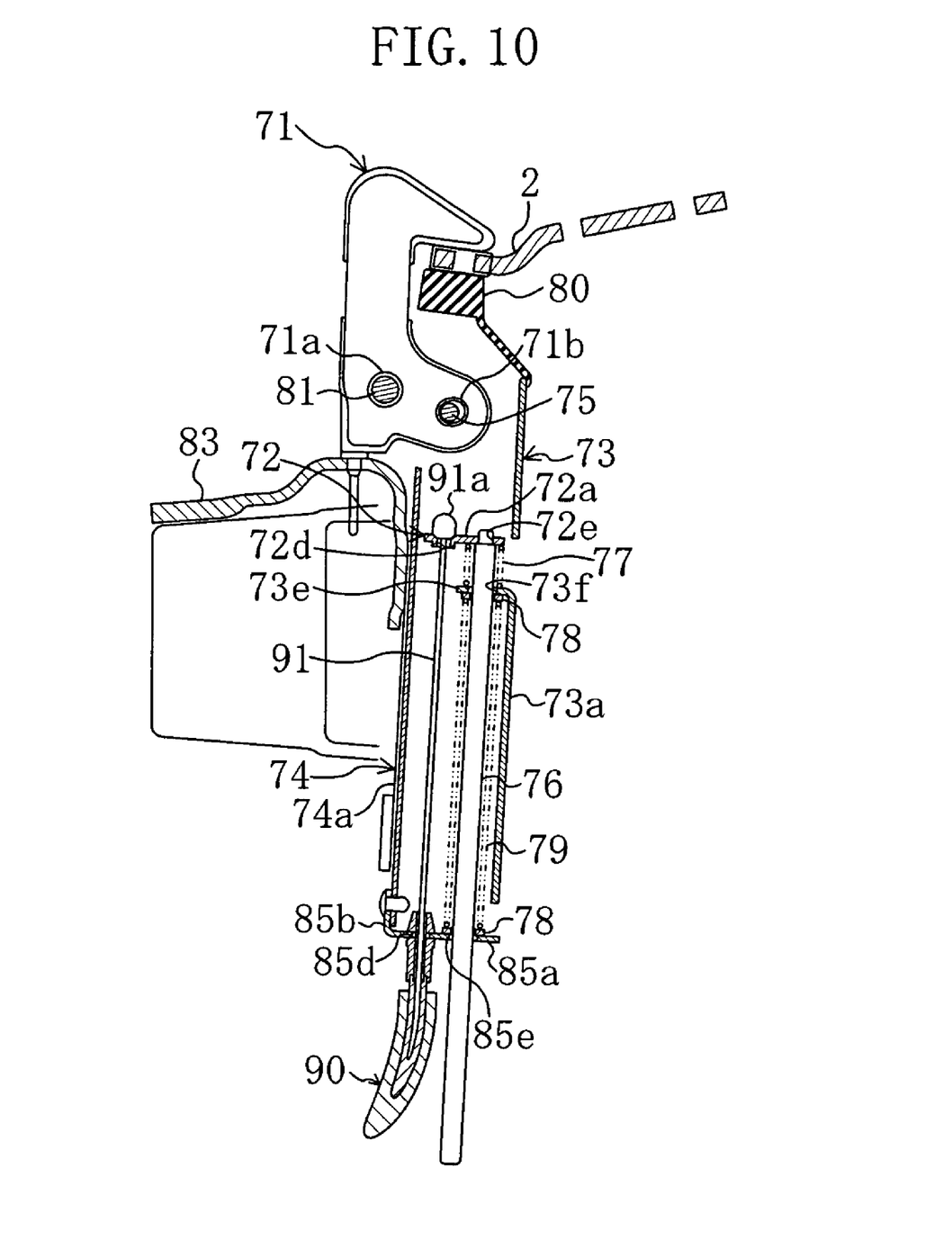
FIG. 10 is a sectional view of the roof locking mechanism at a time when the grip member exists at a retracted position.

FIGS. 1 and 2 are schematic side elevational views showing a road vehicle (a passenger car) 1 provided with a retractable roof 5, FIG. 3 is a side elevational view of a link mechanism 10 and a roof locking apparatus 70, FIG. 4 is an exploded perspective view of the link mechanism 10, FIG. 5 is a perspective view of the link mechanism 10 at a time when a lid (a tonneau cover) 6 is in a closed state as seen from a right rear side of the vehicle, FIG. 6 is a perspective view of the link mechanism 10 at a time when the lid 6 is in an open state as seen from the right rear side of the vehicle, FIG. 7 is an exploded perspective view of a roof locking mechanism, FIG. 8 is a sectional view of the roof locking mechanism at a time when a hook 71 is in a grip-disengaging mode, FIG. 9 is a sectional view of the roof locking mechanism at a time when a grip member exists at a gripping position, and FIG. 10 is a sectional view of the roof locking mechanism at a time when the grip member exists at a retracted position.

Structure of Retractable Roof

As shown in FIGS. 1 and 2, a retractable roof 5 is provided with a front roof 2 forming a ceiling of a passenger compartment, a back roof 3 in a rear side, and a rear window 4, and the front roof 2, the back roof 3, and the rear window 4 are folded so as to be stored in a storage space 7 existing in a vehicle front side of a trunk space in a rear end of a vehicle 1 in a full-open state shown in FIG. 2. In FIG. 1, a full-close state of the retractable roof 5 is shown by a solid line, and a half-open state (a half-closed state) is expressed by a one-dot chain line. Further, when the retractable roof 5 is in the full-open state and the full-close state, the storage space 7 is shielded by a lid 6. The retractable roof 5 is opened and closed by a link mechanism, the lid 6 is opened and closed by a link mechanism 10, and the front roof 2 of the retractable roof 5 in the storage space 7 is retained by a roof locking apparatus 70. However, since the drawing becomes complicated and hard to be viewed, a link mechanism opening and closing the retractable roof 5, the link mechanism 10, and the roof locking apparatus 70 are not shown in FIGS. 1 and 2.

Structure of Link Mechanism

As shown in FIGS. 3 to 6, the link mechanism 10 (corresponding to a lid driver) which can change a position of the lid 6 to an open position (refer to a two-dot chain line in FIG. 3) and a closed position (refer to a solid line in FIG. 3) is a mechanism opening and closing the lid 6 by using a motor 12 as a driving source, and is provided with a main bracket 21 corresponding to a base, a lid bracket 31 fixed to the lid 6, a driving lever 14 (corresponding to a link) structured such that both ends are pivotally coupled to the main bracket 21 and the lid bracket 31 and actuating the link mechanism 10, and a driven lever 15 structured such that both ends are pivotally coupled to the main bracket 21 and the lid bracket 31 and regulating an opening and closing range of the lid 6 and an opening and closing motion. The main bracket 21 is fixed to a vehicle body by being fixed to a bottom surface of the storage space 7. In this case, in FIGS. 5 and 6, since the drawings become complicated and hard to be viewed, an illustration of the driven lever 15 is omitted.

The driving lever 14 is driven by a sector gear 13. The sector gear 13 is rotatably attached to the main bracket 21 corresponding to the base by a sector gear attaching bolt 41, and is driven by a motor 12 via a pinion (not shown). The motor 12 is fixed to a motor bracket 11, and the motor bracket 11 is attached to the main bracket 21 by two bolts 42 and 43. Among these bolts 42 and 43, the bolt 42 is inserted to a hole 45 formed in the motor bracket 11, the bolt 43 is inserted to a long hole 46 formed in the motor bracket 11, and both are screwed with male threaded holes formed in the main bracket 21 while sandwiching washers 51 with respect to the motor bracket 11. The main bracket 21 is provided with a bent portion 52 bent from a surface to which the motor bracket 11 is attached and extending vertically with respect to the surface, and the bent portion 52 is fixed to the motor bracket 11 by inserting an emergency bolt 44 to an attaching hole 53 formed in the bent portion.

When the lid 6 is closed, a hook portion 23 provided in the sector gear 13 is engaged with a hook engagement pin 32 provided in a lid bracket 31 fixed to the lid 6 so as to lock such that the lid 6 is not opened.

As shown in FIGS. 4 to 6, a wire guiding 61 is fixed to a right side surface in a lower end portion of the driving lever 14. The wire guiding 61 is formed as a plate shape, and is formed as an approximately semicircular shape in a side view of the vehicle. A center shaft of the wire guiding 61 comes into line with a rotating shaft in the lower end portion of the driving lever 14. A groove 61a which is open toward an outer side in a diametrical direction is formed in an outer peripheral portion in a right side surface side of the wire guiding 61, and an inner wire 91 of a push-pull cable 90 mentioned below is wound around the groove 61a in a state in which a rear end portion of the inner wire 91 is fixed to the wire guiding 61.

A holder 62 is fixed by weld to the main bracket 21 in such a manner as to cover the groove 61a of the wire guiding 61. The holder 62 is provided for inhibiting the inner wire 91 of the push-pull cable 90 from coming off from the groove 61a of the wire guiding 61.

Structure of Roof Locking Apparatus

As shown in FIGS. 3 and 7 to 10, the roof locking apparatus 70 is provided for retaining a center portion in a vehicle width direction of a front end portion of the front roof 2 in the storage space 7. The roof locking apparatus 70 is structured such as to work with the link mechanism 10. The roof locking apparatus 70 is provided with a hook 71, an internal slider 72, a slider 73, a rail 74, and the push-pull cable 90. The hook 71, the internal slider 72, and the slider 73 construct a grip member gripping the center portion in the vehicle width direction of the front end portion of the front roof 2 which is going to be stored in the storage space 7. The grip member and the rail 74 construct the roof locking mechanism retaining the center portion in the vehicle width direction of the front end portion of the front roof 2 in the storage space 7. The roof locking mechanism is fixed to a portion which opposes to the center portion in the vehicle width direction of the front end portion of the front roof 2 in the storage space 7, in the vehicle body, in a state of being covered by a trim 70a from a vehicle rear side. The rail 74, the push-pull cable 90, and the link mechanism 10 construct a moving mechanism moving the grip member in a vertical direction between a gripping position (refer to a two-dot chain line in FIG. 8 and a solid line in FIG. 9) gripping the front roof 2, and a retracted position (corresponding to a retaining position, refer to a two-dot chain line in FIG. 9 and FIG. 10) provided at a position which is a predetermined distance (for example, 50 mm) away to a lower side from the gripping position and retaining the grip member gripping the front roof 2. In this case, a longitudinal direction of the roof locking apparatus 70 comes into line with a vehicle longitudinal direction, and a lateral direction thereof comes into line with the vehicle width direction. In this case, in FIG. 3, since the drawing becomes complicated and hard to be viewed, an illustration of the retractable roof 5 is omitted.

The hook 71 can be changed to a gripping mode (refer to a two-dot chain line in FIG. 8 and a solid line in FIG. 9) gripping the front roof 2 with respect to a cushion rubber 80 of the slider 73, and a grip-disengaging mode (refer to a solid line in FIG. 8) canceling the retention of the front roof 2, by being forward and backward turned around a center shaft of a shaft 81 mentioned below. In the grip-diengaging mode, the hook 71 is inclined to a vehicle front side. The hook 71 is formed as an approximately C-shaped form in a side view of the vehicle. A circular shaft insertion hole 71a and an oblong pin insertion hole 71b are formed in a front side and a rear side of a lower portion of the hook 71, respectively, so as to extend in the vehicle width direction.

The internal slider 72 is arranged between upper portions of right and left side plates 73b and 73b of the slider 73. The internal slider 72 has a bottom plate 72a, and right and left side plates 72b and 72b extending upward from right and left edge portions of the bottom plate 72a, respectively. A circular pin insertion hole 72c is formed in an upper end portion of each of the side plates 72b so as to oppose to each other. The hook 71 is arranged between both the side plates 72b and 72b in such a manner that the pin insertion hole 71b corresponds to the pin insertion hole 72c in each of the side plates 72b. A pin 75 extending in the vehicle width direction is inserted and supported to the pin insertion hole 72c in each of the side plates 72b and the pin insertion hole 71b of the hook 71. In the manner mentioned above, the hook 71 is supported between both the side plates 72b and 72b of the internal slider 72 so as to be rotatable around a center shaft of the pin 75. A circular wire retaining hole 72d and a circular rod insertion hole 72e are formed in a front side and a rear side of the bottom plate 72a, respectively. An upper end portion of the inner wire 91 of the push-pull cable 90 is retained to the wire retaining hole 72d. Specifically, the upper end portion of the inner wire 91 is retained to the wire retaining hole 72d by attaching a retaining tool 91a to the upper end portion of the inner wire 91 in a state in which the upper end portion is inserted to the wire retaining hole 72d. An upper end portion of the rod 76 is inserted and fixed to the rod insertion hole 72e.

The rod 76 is formed as a columnar shape, and extends in a vertical direction. A sub spring 77, a bush 78, a main spring 79, and the bush 78 are outward fitted to the rod 76 alphabetically from the above. The sub spring 77 is provided for changing the hook 71 to the gripping mode and the grip-disengaging mode. The main spring 79 is provided for moving the grip member in the vertical direction between the gripping position and the retracted position. The main spring 79 is longer than the sub spring 77. An elastic property of the main spring 79 is different from an elastic property of the sub spring 77. Specifically, a spring constant of the main spring 79 is larger than a spring constant of the sub spring 77 in such a manner as to prevent the grip member from moving to a lower side than the gripping position along the rail 74 against an elastic force of the main spring 79 before gripping the front roof 2 against an elastic force of the sub spring 77 by the grip member at the gripping position.

The slider 73 is formed as an approximately C-shaped horizontal cross sectional form, and has a bottom plate 73a, and right and left side plates 73b and 73b extending to the vehicle front side from right and left edge portions of the bottom plate 73a. A length in the vehicle longitudinal direction of each of the side plates 73b becomes longer toward the above. A projection portion 73c projecting to the above is arranged in an upper edge portion of each of the side plates 73b. A cushion rubber 80 is fixed to both the projection portions 73c and 73c in a state in which both the projection portions 73c are inserted to two insertion holes (not shown) of the cushion rubber 80. The cushion rubber 80 is provided for regulating a motion of a top block cover (not shown) of the front roof 2 so as to inhibit the front roof 2 from bowing down. The cushion rubber 80 covers the slider 73 from an upper side thereof. A rear surface of the cushion rubber 80 is formed in such a manner as to be inclined to a rear side of the vehicle in accordance with going to a lower side.

A circular shaft insertion hole 73d is formed in a front side of an upper portion of each of the side plates 73b of the slider 73 in such a manner so as to oppose to each other. The internal slider 72 rotatably attaching the hook 71 thereto is arranged between both the side plates 73b and 73b, in such a manner that the shaft insertion hole 71a of the hook 71 corresponds to the shaft insertion hole 73d of each of the side plates 73b. A shaft 81 extending in the vehicle width direction is inserted and supported to the shaft insertion hole 73d in each of the side plates 73b and the shaft insertion hole 71a of the hook 71. In the manner mentioned above, the hook 71 is supported between both the side plates 73b and 73b of the slider 73 so as to be rotatable around a center shaft of the shaft 81.

An intermediate plate 73e is arranged in an inner surface in the upper portion of the slider 73 in such a manner as to extend in a horizontal direction. A circular rod insertion hole 73f is formed in the intermediate plate 73e. The rod 76 is inserted to the rod insertion hole 73f so as to be movable in a vertical direction. Further, the sub spring 77 is arranged between an upper surface of the intermediate plate 73e and a lower surface of a bottom plate 72a of the internal slider 72, and the bush 78, the main spring 79 and the bush 78 are arranged between a lower surface of the intermediate plate 73e and an upper surface of a bottom plate 85a of a bottom member 85 mentioned below, alphabetically from the above.

A protruding portion 73g protruding outward in the vehicle width direction is arranged in a front side of an outer surface in the lower portion of each of the side plates 73b in the slider 73. A projection portion 73h projecting to the front side of the vehicle is arranged in a front edge portion of the lower portion of each of the side plates 73b. A cushion stopper 82 is fixed to each of the projection portions 73h in such a manner as to cover the projection portion 73h thereof. The cushion stopper 82 is provided for regulating the position of the slider 73 of the grip member between the gripping position and the retracted position.

The rail 74 is provided for making the slider 73 of the grip member movable in the vertical direction between the gripping position and the retracted position. The rail 74 is screw fixed to the hook bracket 83. The hook bracket 83 is fixed to a portion opposing to the center portion in the vehicle width direction of the front end portion of the front roof 2 in the storage space 7 in the vehicle body, and is formed as an approximately L-shaped form in the vehicle side view. In other words, the rail 74 is attached to the portion opposing to the center portion in the vehicle width direction of the front end portion of the front roof 2 in the storage space 7 in the vehicle body via the hook bracket 83. The rail 74 is formed in an approximately C-shaped horizontal cross section, and has a bottom plate 74a, and right and left side plates 74b and 74b extending to the vehicle rear side from right and left edge portions of the bottom plate 74a. Two approximately rectangular stopper insertion holes 74c and 74c are formed in an upper portion and a lower portion of the bottom plate 74a, respectively, so as to be spaced at a predetermined interval from each other in the vehicle width direction. The stopper 84 is inserted and fixed to the stopper insertion hole 74c.

The stopper 84 is provided for regulating the position of the slider 73 of the grip member between the gripping position and the retracted position. The stopper 84 has two upper stoppers 84a and 84a, and two lower stoppers 84b and 84b. Each of the upper and lower stoppers 84a and 84b is formed as an approximately triangular shape in a vehicle side view. A rear surface of each of the upper stoppers 84a is formed so as to be inclined to the vehicle rear side in accordance with going to the below, and a rear surface of each of the lower stoppers 84b is formed so as to be inclined to the vehicle rear side in accordance with going to the above. In this case, the gripping position and the retracted position are changed by changing positions of a lower surface of each of the upper stoppers 84a and an upper surface of each of the lower stoppers 84b. In other words, a predetermined distance between the gripping position and the retracted position is changed by changing a distance between the lower surface of each of the upper stoppers 84a and the upper surface of each of the lower stoppers 84b.

A pair of rail plates 74d and 74d extending to an inner side in the vehicle width direction are arranged in an inner surface of each of the side plates 74b of the rail 74 so as to be spaced at a fixed interval from each other. Each of the protruding portions 73g of the slider 73 is fitted between both the rail plates 74d and 74d so as to be movable in the vertical direction.

The bottom member 85 is fixed to a lower end portion of the rail 74 so as to cover the lower end portion of the rail 74 from the lower side thereof. The bottom member 85 has a bottom plate 85a, and a front side plate 85b and right and left side plates 85c and 85c extending to the above from a front edge portion and right and left edge portions of the bottom plate 85a, respectively. A circular wire insertion hole 85d and a circular rod insertion hole 85e are formed in a front side and a rear side of the bottom plate 85a, respectively. An inner wire 91 of the push-pull cable 90 is inserted to the wire insertion hole 85d so as to be movable in the vertical direction. The rod 76 is inserted to the rod insertion hole 85e so as to be movable in the vertical direction. The front side plate 85b and the right and left side plates 85c and 85c are fixed by rivet to the bottom plate 74a and the right and left side plates 74b and 74b of the rail 74, respectively.

The push-pull cable 90 is provided for transmitting a driving force (an operating force) of the link mechanism 10 to the roof locking mechanism so as to carry out a retaining motion of the front roof 2 in the storage space 7 and a canceling motion thereof. The push-pull cable 90 is structured, as mentioned above, such that one end portion is attached to the internal slider 72 of the grip member, and the other end portion is attached to the wire guiding 61 of the link mechanism 10.

Motion of Roof Locking Apparatus

A description will be given below of a motion of the roof locking apparatus 70 with reference to FIGS. 5, 6, and 8 to 10.

At the beginning, a description will be given of a motion of the roof locking apparatus 70 at a time of storing the retractable roof 5 in the storage space 7. In this case, in the following description, there is described the motion of the roof locking apparatus 70 after the retractable roof 5 comes to a half-open state from a full-close state, that is, after the lid 6 comes to an open state from a close state (refer to FIG. 1). In this case, when the lid 6 is in the open state, the link mechanism 10 is in a state shown in FIG. 6, and the roof locking mechanism is in a state shown by a solid line in FIG. 8.

If the link mechanism 10 starts the position changing motion from the open position of the lid 6 to the closed position, the driving lever 14 of the link mechanism 10 is forward rotated in a clockwise direction shown in FIG. 6 around a rotating shaft in its lower end portion. In accordance with this, the wire guiding 61 of the link mechanism 10 is forward rotated in the clockwise direction shown in FIG. 6 around its center axis. Accordingly, the inner wire 91 of the push-pull cable 90 is wound by the wire guiding 61 of the link mechanism 10 so as to be pulled to the wire guiding 61 side. In accordance with this, the internal slider 72 is pulled to the lower side against the elastic force of the sub spring 77 by the inner wire 91 so as to be moved to a lower side. Further, the rear side of the lower portion of the hook 71 is pulled to the lower side by the internal slider 72, and the hook 71 is forward rotated in a clockwise direction shown in FIG. 8 around a center axis of the shaft 81. Accordingly, the hook 71 is changed from the grip-disengaging mode to the gripping mode, and the front roof 2 is gripped by the grip member at the gripping position. As mentioned above, the retaining motion of the front roof 2 in the storage space 7 is started by the roof locking mechanism approximately at the same time (same timing) when the position changing motion of the lid 6 to the closed position is started by the link mechanism 10.

Thereafter, the grip member gripping the front roof 2 is pulled to the lower side against the elastic force of the main spring 79 by the inner wire 91 so as to be slidably moved to the lower side along the rail 74. If the grip member griping the front roof 2 is slidably moved to the retracted position, the cushion stopper 82 of the slider 73 of the grip member comes into contact with the upper surface of the lower stopper 84*b* of the rail 74. Accordingly, the grip member gripping the front roof 2 at the retracted position is stopped by the stopper 84 so as to be retained. Further, the retaining motion of the front roof 2 in the storage space 7 by the roof locking mechanism is finished approximately at the same time (same timing) when the position changing motion of the lid 6 to the closed position by the link mechanism 10 is finished. In this case, when the lid 6 is in the closed position, the link mechanism 10 is in a state shown in FIG. 5, and the roof locking mechanism is in a state shown in FIG. 10.

Next, a description will be given of a motion of the roof locking apparatus 70 at a time of getting the retractable roof 5 stored in the storage space 7 out of the storage space 7. If the link mechanism 10 starts the position changing motion from the closed position of the lid 6 to the open position, the driving lever 14 of the link mechanism 10 is backward rotated in a counterclockwise direction shown in FIG. 5 around a rotating shaft in its lower end portion. In accordance with this, the wire guiding 61 of the link mechanism 10 is backward rotated in the counterclockwise direction shown in FIG. 5 around its center axis. Accordingly, the inner wire 91 of the push-pull cable 90 is going to be discharged to an opposite side to the wire guiding 61 by the wire guiding 61 of the link mechanism 10, that is, is going to be loosened. Further, the grip member gripping the front roof 2 is pushed up to the upper side by the elastic force of the main spring 79 so as to be slidably moved to the upper side along the rail 74. As mentioned above, the canceling motion of the retention of the front roof 2 in the storage space 7 by the roof locking mechanism is started approximately at the same time (same timing) when the position changing motion of the lid 6 to the open position by the link mechanism 10 is started.

Incidentally, if the grip member gripping the front roof 2 is slidably moved to the gripping position, the cushion stopper 82 of the slider 73 of the grip member comes into contact with the upper stopper 84*a* of the rail 74. Accordingly, the slider 73 of the grip member gripping the front roof 2 at the gripping position is stopped by the stopper 84 so as to be retained.

Thereafter, the internal slider 72 is pushed up to the upper side by the elastic force of the sub spring 77 so as to be moved to the upper side. Further, the rear side of the lower portion of the hook 71 is pushed up to the upper side by the internal slider 72, and the hook 71 is backward rotated in the counterclockwise direction shown in FIG. 8 around the center axis of the shaft 81. Accordingly, the hook 71 is changed from the gripping mode to the grip-disengaging mode, and the grip of the front roof 2 by the grip member is canceled at the gripping position. Further, the canceling motion of the retention of the front roof 2 in the storage space 7 by the roof locking mechanism is finished approximately at the same time (same timing) when the position changing motion of the lid 6 to the open position by the link mechanism 10 is finished.

Effect

As mentioned above, in accordance with the present embodiment, since the roof locking apparatus 70 retaining the front roof 2 in the storage space 7 is worked with the link mechanism 10, it is not necessary to provide the driving source which is exclusive for the roof locking apparatus 70, and it is possible to reduce the number of the members of the present retractable roof system.

Further, since the roof locking apparatus 70 is structured such as to start the retaining motion of the front roof 2 in the storage space 7 approximately at the same time when the link mechanism 10 starts the position changing motion of the lid 6 to the closed position, and finish the retaining motion of the front roof 2 in the storage space 7 approximately at the same time when the link mechanism 10 finishes the position changing motion of the lid 6 to the closed position, in the case of storing the retractable roof 5 in the storage space 7, it is possible to retain the front roof 2 in the storage space 7 at a suitable timing.

Further, since the roof locking apparatus 70 is structured such as to start the canceling motion of the retention of the front roof 2 in the storage space 7 approximately at the same time when the link mechanism 10 starts the position changing motion of the lid 6 to the open position, and finish the canceling motion of the retention of the front roof 2 in the storage space 7 approximately at the same time when the link mechanism 10 finishes the position changing motion of the lid 6 to the open position, in the case of getting the retractable roof 5 stored in the storage space 7 out of the storage space 7, it is possible to cancel the retention of the front roof 2 in the storage space 7 at a suitable timing.

Further, since the driving force of the link mechanism 10 is transmitted to the roof rock mechanism so as to carry out the retaining motion of the front roof 2 in the storage space 7 and the canceling motion thereof, by the push-pull cable 90, it is possible to securely retain the front roof 2 in the storage space 7 and cancel the retention.

Further, since the transmission mechanism is constructed by the push-pull cable 90, it is possible to retain and cancel the front roof 2 in the storage space 7 on the basis of the simple structure.

Further, since the wire guiding 61 of the link mechanism 10 carries out the pulling motion and the discharging motion of the push-pull cable 90, it is possible to retain the front roof 2 in the storage space 7 and cancel the retention on the basis of the simple structure.

Further, since the groove 61*a* around which the push-pull cable 90 is wound is formed in the wire guiding 61, the wire guiding 61 can securely carry out the pulling motion and the discharging motion of the push-pull cable 90.

Further, since the holder 62 is provided in such a manner as to cover the groove 61*a* of the wire guiding 61, it is possible to inhibit the push-pull cable 90 from coming off from the groove 61*a*.

Other Embodiment

In the embodiment mentioned above, the description is given of the retention of the front roof 2 in the storage space 7, however, it is possible to retain a retractable roof in a predetermined space which is different from the trunk space other than the storage space 7, for example, a retractable roof at the full-close position.

Further, in the embodiment mentioned above, the front roof 2 in the storage space 7 is retained, however, the other roof than the front roof 2 may be retained.

Further, in the embodiment mentioned above, the center portion in the vehicle width direction of the front end portion of the front roof 2 in the storage space 7 is retained, however, the other portions than the front roof 2 in the storage space 7 may be retained.

Further, in the embodiment mentioned above, the transmission mechanism is constructed by the push-pull cable 90, however, the transmission mechanism may be constructed by any element as far as it can transmit the driving force of the link mechanism 10 to the roof locking mechanism so as to carry out the retaining motion of the front roof 2 and the canceling motion thereof.

Further, in the embodiment mentioned above, the roof locking apparatus 70 is structured such as to start the retaining motion of the front roof 2 in the storage space 7 approximately at the same time when the link mechanism 10 starts the position changing motion of the lid 6 to the closed position, and finish the retaining motion of the front roof 2 approximately at the same time when the link mechanism 10 finishes the position changing motion of the lid 6 to the closed position, in the case of storing the retractable roof 5 in the storage space 7, however, it is not necessary to start the retaining motion of the front roof 2 approximately at the same time, or it is not necessary to finish the retaining motion approximately at the same time.

Further, in the embodiment mentioned above, the roof locking apparatus 70 is structured such as to start the canceling motion of the retention of the front roof 2 in the storage space 7 approximately at the same time when the link mechanism 10 starts the position changing motion of the lid 6 to the open position, and finish the canceling motion of the retention of the front roof 2 approximately at the same time when the link mechanism 10 finishes the position changing motion of the lid 6 to the open position, in the case of getting the retractable roof 5 stored in the storage space 7 out of the storage space 7, however, it is not necessary to start the canceling motion of the retention of the front roof 2 approximately at the same time, or it is not necessary to finish the canceling motion approximately at the same time.

Further, in the embodiment mentioned above, the wire guiding 61 of the link mechanism 10 carries out the pulling motion and the discharging motion of the push-pull cable 90, however, the other portion of the link mechanism 10 may carry out the pulling motion and the discharging motion of the push-pull cable 90.

Further, in the embodiment mentioned above, the groove 61*a* around which the push-pull cable 90 is wound is formed in the wire guiding 61, however, it is not necessary to form the groove 61*a* as far as the other end portion of the push-pull cable 90 is attached to the wire guiding 61, and the wire guiding 61 can carry out the pulling motion and the discharging motion of the push-pull cable 90. In this case, in order to make the wire guiding 61 securely carry out the pulling motion and the discharging motion of the push-pull cable 90, it is desirable to form the groove 61*a*.

Further, in the present embodiment, the holder 62 is provided in the main bracket 21, however, it is not necessary to provide the holder 62. In this case, in order to inhibit the push-pull cable 90 from deflecting from the groove 61*a* of the wire guiding 61, it is desirable to provide the holder 62.

The present invention is not limited to the embodiment, but can be executed by the other various aspects without deviating from the scope or the major feature of the present invention.

As mentioned above, the embodiment mentioned above is nothing but the only exemplification in every points, and should not be interpreted as a limited meaning. The range of the present invention is indicated by claims, and is not restricted by the specification at all. Further, modifications and changes belonging to an equivalent range of claims are all within the range of the present invention.

INDUSTRIAL APPLICABILITY

As described above, the retractable roof system for a vehicle in accordance with the present invention can be applied to an intended use reducing the number of the members, or the like.

The invention claimed is:

1. A retractable roof system for a vehicle having a lid covering a storage space when a retractable roof is in full-open state or full-close state, the storage space being different from a trunk space, comprising:

a roof locking apparatus provided in the vehicle and retaining the retractable roof in the storage space; and a lid driver provided in said vehicle to change a position of said lid between an open position and a closed position, the roof locking apparatus comprising:

a roof locking mechanism retaining the roof in the storage space; and a transmission mechanism transmitting a driving force of the lid driver to said roof locking mechanism so as to carry out the locking of the roof and the release thereof, the transmission mechanism having a push-pull cable in which one end portion is attached to the roof locking mechanism, and the other end portion is attached to the lid driver, and the push-pull cable is structured such as to be pulled so as to make the roof locking mechanism carry out the locking of the retractable roof in the case that the lid driver carries out the position changing motion of the lid to the closed position, at a time of storing the retractable roof in the storage space, and be discharged so as to make the roof locking mechanism carry out the releasing of the retention of the retractable roof in a case that the lid driver carries out the position changing motion of the lid to the open position, at a time of getting the retractable roof out of the storage space wherein the roof locking apparatus is structured to work with the lid driver.

2. The retractable roof system for a vehicle according to claim 1, wherein the retractable roof locking apparatus is structured such as to retain the roof in the storage space corresponding to a predetermined space.

3. The retractable roof system for a vehicle according to claim 2, wherein the retractable roof has a front roof, a rear roof, and a rear window, and the roof locking apparatus is structured such as to retain the front roof in the storage space.

4. The retractable roof system for a vehicle according to claim 2, wherein the roof locking apparatus is structured such as to start a locking motion of the retractable, roof in the storage space approximately at the same time when the lid driver starts a position changing motion of the lid to the closed position, and finish the retaining motion of the roof approximately at the same time when the lid driver finishes the position changing motion of the lid to the closed position when storing the retractable roof in the storage space.

5. The retractable roof system for a vehicle according to claim 2, wherein the roof locking apparatus is structured such as to start a releasing of the retention of the roof in the storage space approximately at the same time when the lid driver starts the position changing motion of the lid to the open position, and finishes the releasing of the retention of the roof approximately at the same time when the lid driver finishes the position changing motion of the lid to the open position, when getting the retractable roof out of said storage space.

6. The retractable roof system for a vehicle according to claim 1, wherein the lid driver has a link which is fixed to the lid and is provided for changing said lid to the open position and the closed position, and a wire guiding fixed to said link and to which the other end portion of the push-pull cable is attached, the wire guiding carries out a pulling motion of the push-pull cable in the case that the link carries out the position changing motion of the lid to the closed position at a time of storing the retractable roof in the storage space, and the wire guiding carries out a discharging motion of the push-pull cable in a case that the link carried out the position changing motion of the lid to the open position, at a time of getting the retractable roof stored in the storage space out of said storage space.

7. The retractable roof system for a vehicle according to claim 6, wherein a groove around which the push-pull cable is wound is formed in the wire guiding.

8. The retractable roof system for a vehicle according to claim 7, wherein the lid driver further has a holder provided so as to cover the groove.

* * * * *